Oct. 6, 1964  C. RANELLI  3,151,424
AUTOMATIC WORK HOLDER WITH COMPOUND MOVEMENT
Filed Aug. 10, 1960  5 Sheets-Sheet 5
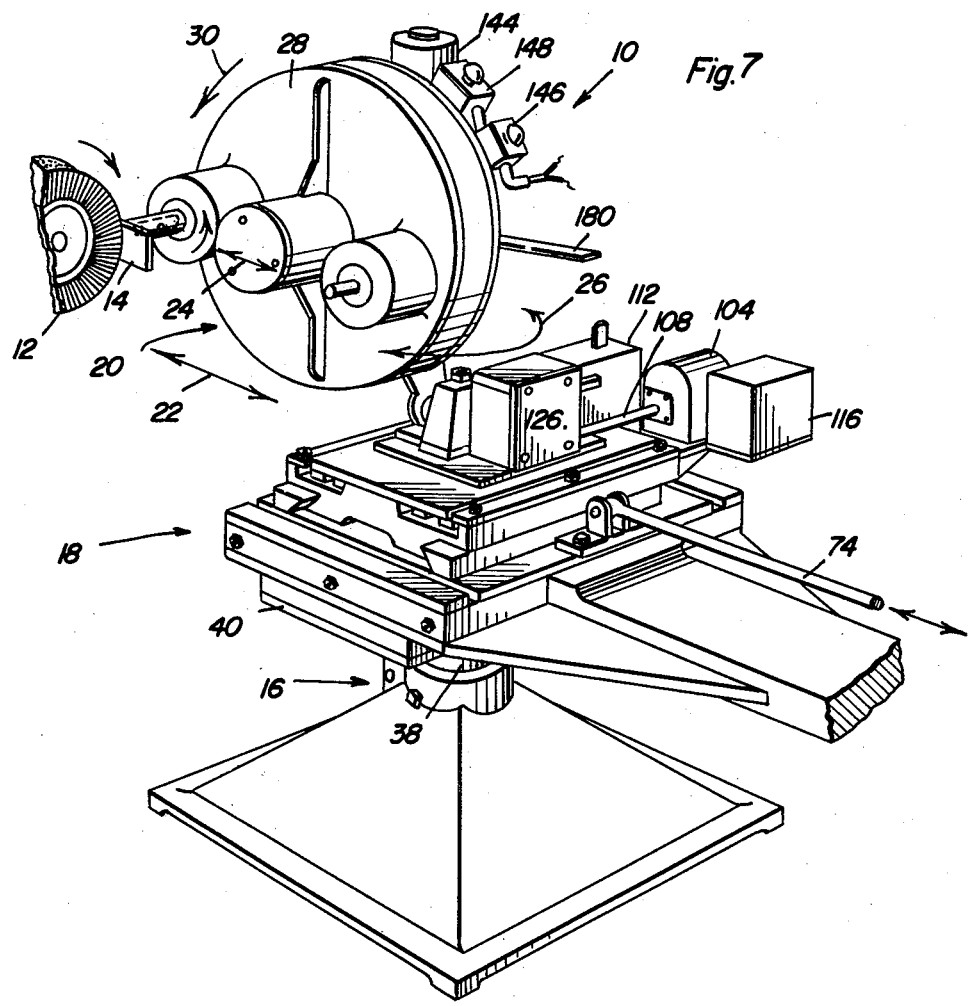
Claude Ranelli
INVENTOR.

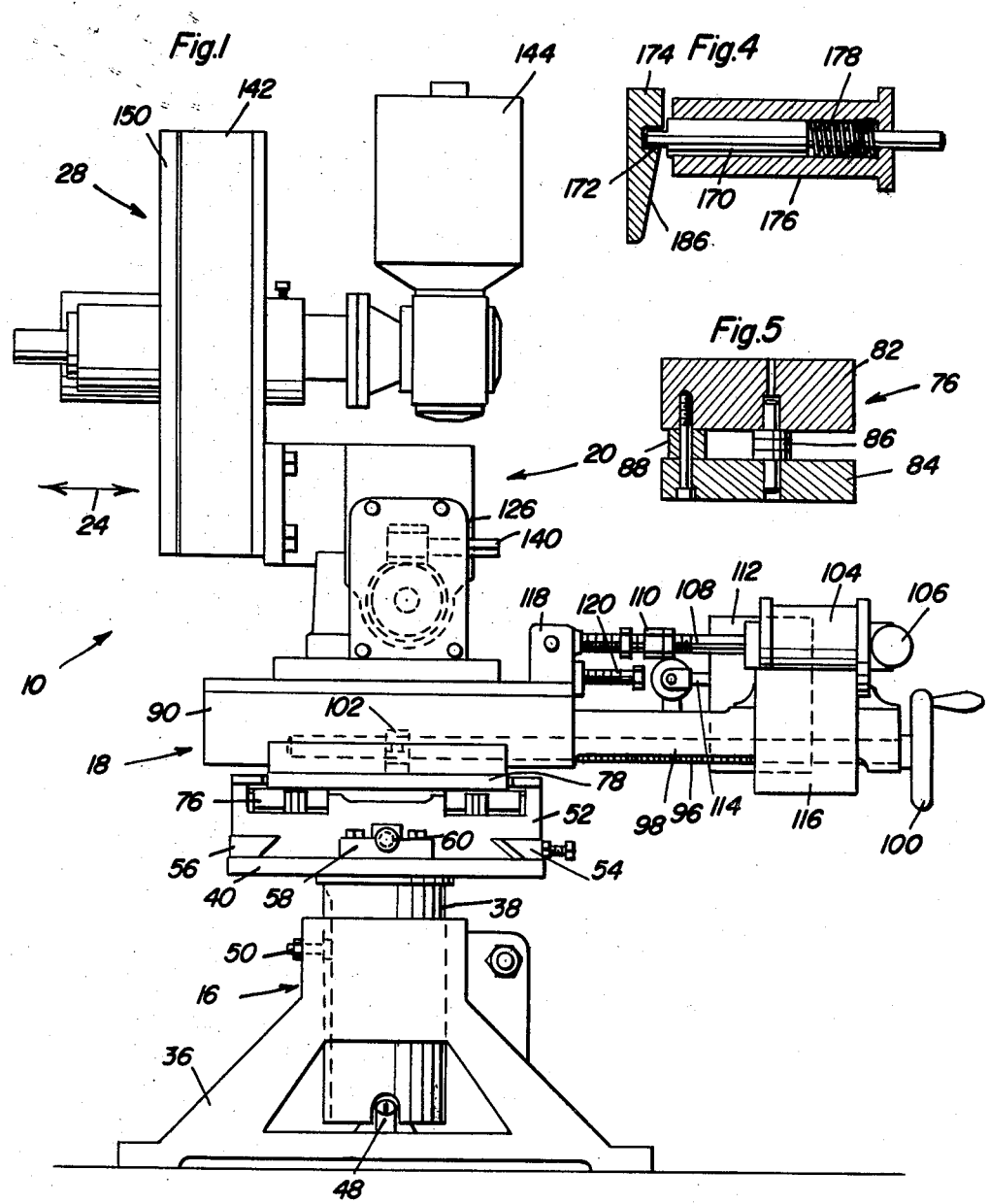

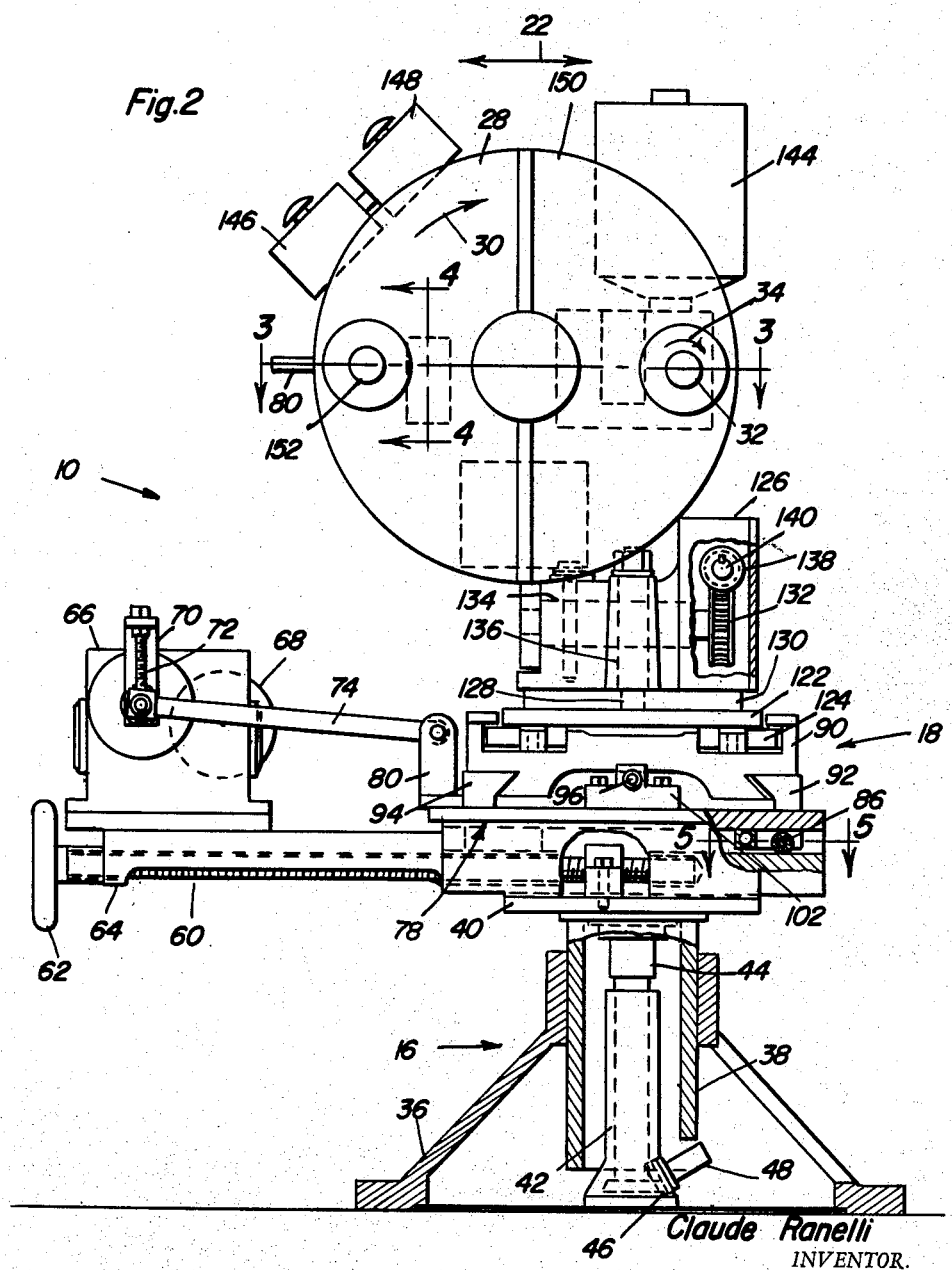

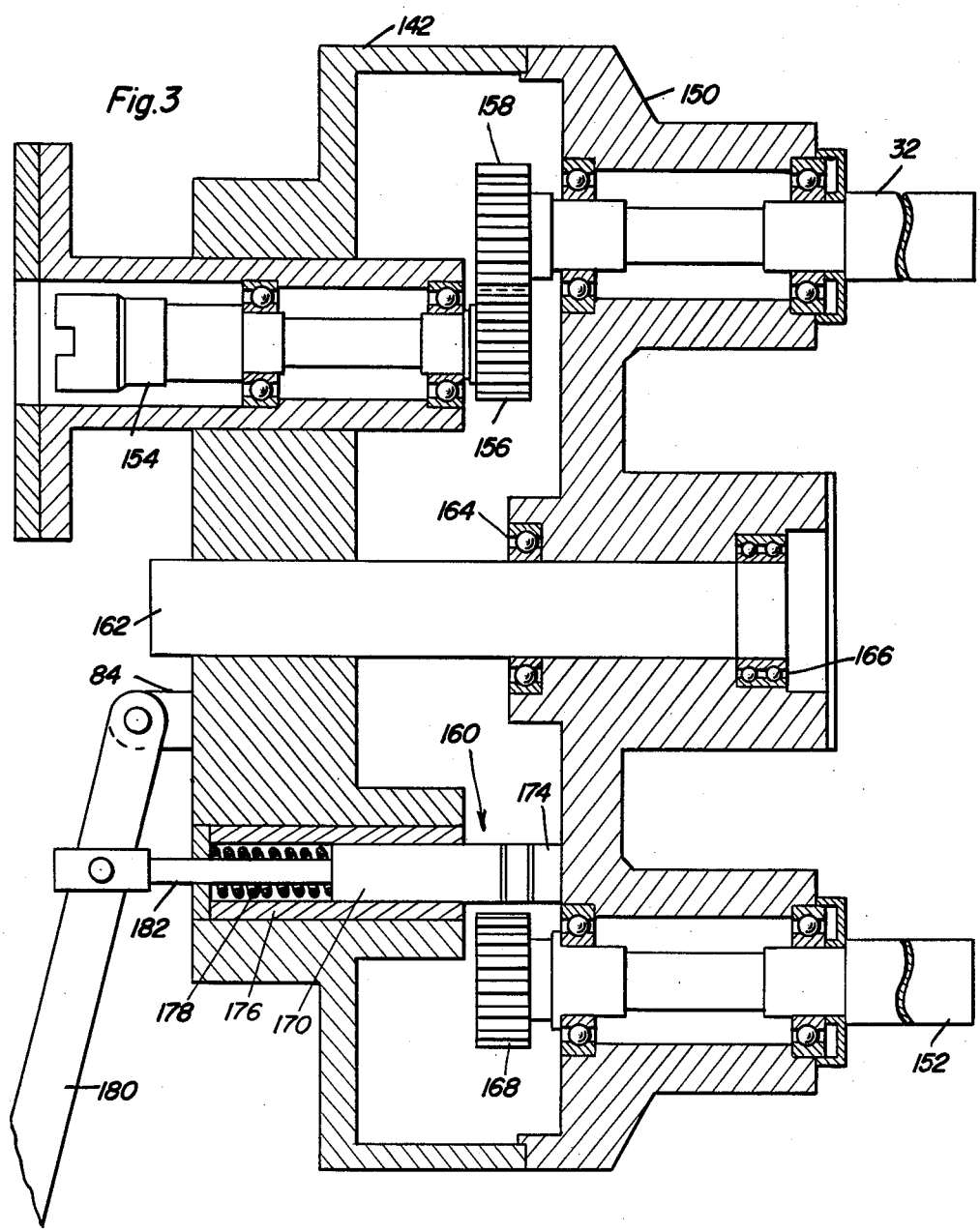

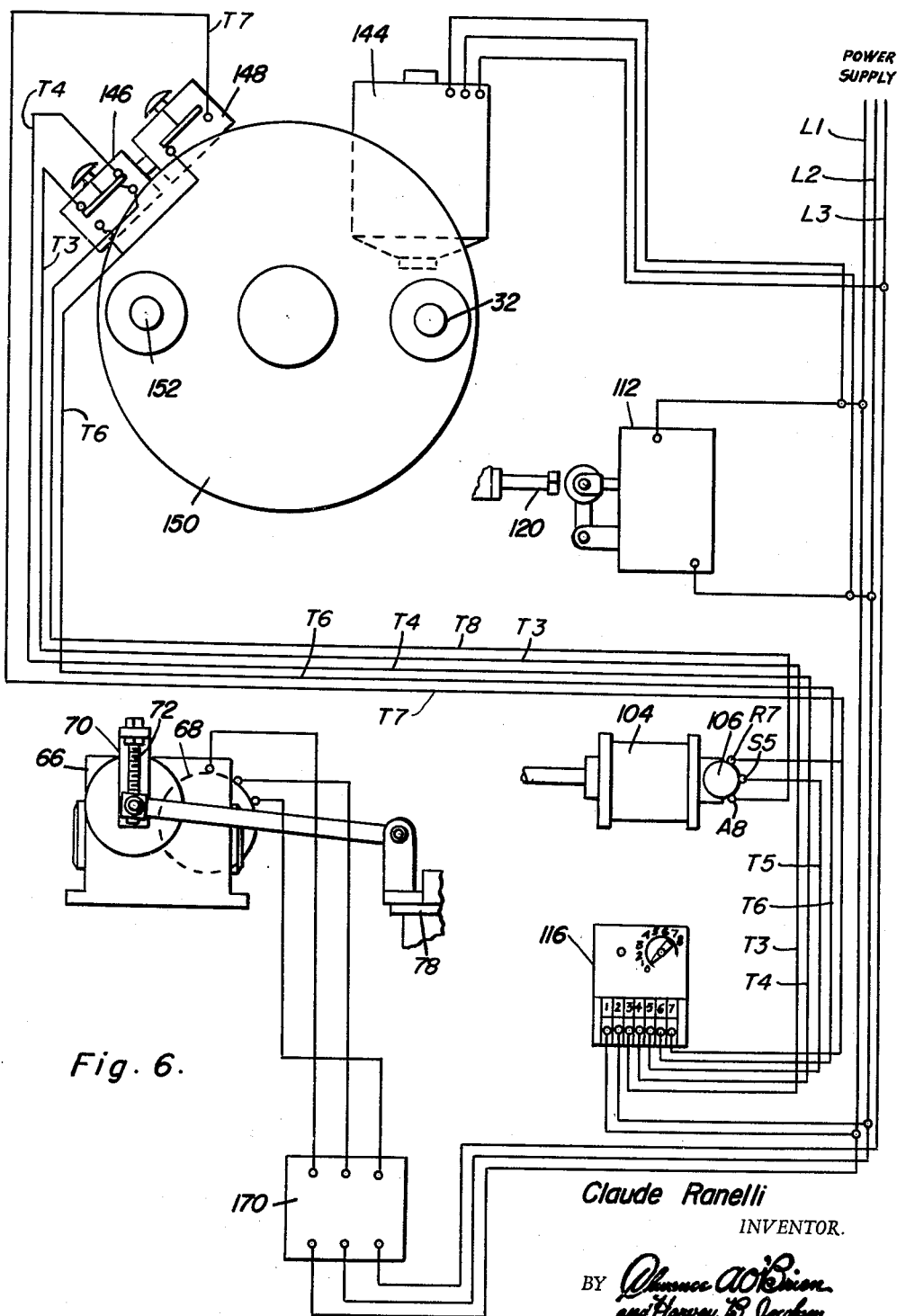

United States Patent Office

3,151,424
Patented Oct. 6, 1964

3,151,424
AUTOMATIC WORK HOLDER WITH
COMPOUND MOVEMENT
Claude Ranelli, 20821 Syracuse, Warren, Mich.
Filed Aug. 10, 1960, Ser. No. 48,640
4 Claims. (Cl. 51—232)

This invention relates to a machine on which workpieces are mounted so that such workpieces may be properly positioned and moved relative to another machine such as a buffer or buffing wheel for polishing the workpiece.

This machine when used in conjunction with a buffing wheel, will automatically advance the workpiece into contact with the buffing wheel, rotate and oscillate the workpiece a predetermined number of times, then retract the workpiece from the buffing wheel, and automatically rotate the workpiece out of line with the buffing wheel and interrupting its rotation so that the workpiece may be removed from the machine.

It is therefore a primary object of this invention to provide a machine which automatically positions and moves work into contact with a buffing wheel the proper length of time after which the work is retracted and conditioned on the machine for removal thereof.

It is a further object of this invention, in accordance with the foregoing object, to provide a work holding machine which is accurately adjustable for use with different buffing wheels and workpieces both as to spatial dimensions and time.

In accordance with the foregoing objects, the machine of this invention includes a vertically adjustable bed upon which a slidably adjustable table is mounted. Slidably mounted on the table is a cross rail slide which is reciprocated when the work is being held in contact with a buffing wheel for moving said work across the buffing wheel. Another slide member is slidably mounted on the cross slide for advancing or retracting the workpiece into and out of contact with the buffing wheel. The stroke of the latter slide member is also adjustable in order to accommodate different distances between the buffing wheel and workpiece. The work-advancing and retracting slide member carries a work head mounting which is angularly adjustable, said mounting rotatably carrying a head member upon which two work carrying spindles are journaled. The head member is automatically rotated in one direction on its mounting when selectively released therefrom by a latch mechanism, for indexing one spindle out of driving engagement with the spindle drive motor and the other spindle into drive engagement with the spindle drive motor, which spindle drive motor is mounted on the head member mounting. Accordingly, when the advancing slide member on the table structure is advanced it will bring the workpiece on the driven spindle into contact with the buffing wheel while the cross slide member will be reciprocated by a second motor mounted on the table bed. After a predetermined period of time, the advancing slide member will retract the work-piece from the buffing wheel while a limit switch interrupts the drive of the reciprocating cross slide member so that the lock mechanism between the work spindle head and its mounting may be released causing the head to rotate the work carrying spindle out of drive engagement with the spindle driving motor so that the workpiece may be removed therefrom and at the same time placing the other spindle into drive engagement after it had been loaded with another workpiece. An electrically controlled air motor is used to advance and retract the slide member and accordingly, electrical circuit control means including a timing circuit is used to energize and control the spindle driving motor, reciprocating cross slide drive motor and the electrically controlled air motor for proper sequential operation as hereinabove indicated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the machine in accordance with this invention with parts shown in section.

FIGURE 2 is a front elevational view of the machine in accordance with this invention with parts shown in section.

FIGURE 3 is a sectional view taken through a plane indicated by section line 3—3 in FIGURE 2 showing the gear drive for the work spindle and head member.

FIGURE 4 is a sectional view taken through a plane indicated by section line 4—4 in FIGURE 2, showing the spindle head lock mechanism.

FIGURE 5 is a sectional view taken through a plane indicated by section line 5—5 in FIGURE 2, showing one of the slide bearing plate assemblies.

FIGURE 6 is a schematic wiring diagram showing the electrical control system for operating the machine in accordance with this invention.

FIGURE 7 is a perspective view of part of the machine in accordance with this invention, and showing its relationship to a buffing wheel.

Referring first to FIGURES 1, 2 and 7, reference numeral 10 generally indicates the machine in accordance with this invention, while reference numeral 12 refers to the buffing wheel shown in contact with a workpiece 14 mounted on the machine 10; see FIGURE 7. The machine 10 includes a pedestal portion generally indicated by reference numeral 16, a table portion generally indicated by reference numeral 18 and a head portion generally indicated by reference numeral 20. As will be hereafter explained, the pedestal portion 16 is vertically adjustable, the table portion 18 is horizontally adjustable in two directions perpendicular to each other and reciprocable in one of said directions as indicated by arrow 22 in FIGURES 7 and 2 and advanced and retracted in the other direction as indicated by arrow 24 in FIGURES 7 and 1. The head portion 20 which is mounted on the table portion 18, is therefore movable by said table portion in the two directions indicated by arrows 22 and 24. The head portion's position on the table portion 18 is also angularly adjusted as indicated by arrow 26 in FIGURE 7 while the spindle mounting head assembly 28 on the head portion is rotatable in one direction as indicated by arrow 30 in FIGURES 7 and 2 while one of the spindles 32 is rotated in one direction as indicated by arrow 34 in FIGURE 2.

The pedestal portion 16 includes a stationary base 36 which may be bolted or otherwise adjustably secured to the floor, said base slidably supporting a standard 38 to which is fixed a bed 40. Fixed to the stationary base is an elongated screw jack member 42 having a screw jack 44 threadedly engaged therein and actuated by bevel gearing 46 for raising or lowering the bed 40 and standard 38 fixed thereto. A tool may accordingly be inserted onto shaft 48 in order to rotate the bevel gearing 46 for raising or lowering the jack 44 while a setscrew device 50 is provided for holding the standard 38 and bed 40 in a vertically adjusted position.

The table portion 18 is adjustably mounted on the bed 40 and includes a first slide member 52 slidably supported on the bed 40 by adjustable rail 54 and rail 56 on the bed 40, the slide 52 being adjustable by means of a nut member 58 secured to the bed 40 and a screw member 60 rotatable by means of handle 62 which screw member 60 is rotatably journaled within the slide member 52 by means of slide extension 64 as more clearly seen in FIGURE 2. Also mounted on the slide extension 64 is a gear box 66 and an electric motor mounted thereon indicated by reference numeral 68 causing rotation of a crank member 70 connected by adjustable screw means 72 to a connecting rod 74. The connecting rod 74 may accordingly be reciprocated by motor 68 with a stroke that may be adjusted.

The slide member 52 in turn slidably mounts by means of slidable bearing assemblies generally indicated by reference numeral 76, a cross slide member 78. The previously mentioned connecting rod 74 is connected to the cross slide member 78 by means of ears 80 fixed to cross slide member 78 and pivotally connected to the connecting rod 74 as more clearly seen in FIGURE 2. Accordingly, reciprocation of connecting rod 74 causes the cross slide member 78 to reciprocate relative to member 52. The bearing assemblies are accordingly provided in order to accommodate such relative reciprocation and said bearing plate assembly is more clearly shown in FIGURE 5 as including two plates 82 and 84 which may be fixed to the cross slide member 78 and journals therebetween ball bearing 86, said plates being further spaced by spacer 88, the axis of the ball bearing 86 being offset from that of the spacer screw in order to slidably support the slide member 78 on the roller bearing 86 as more clearly seen in the broken away portion of FIGURE 2 through which section line 5—5 extends.

An adjustable feed slide 90 is slidably supported on the cross slide member 78 by means of adjustable rails 92 and 94 secured to the slide member 78. A second screw adjustment means is provided including the screw member 96 rotatably supported by extension 98 fixed to the member 90 and actuated by handwheel 100 for threadedly engaging said screw member 96 with a nut member 102 secured to the slide member 78 to thereby relatively adjust the position of member 90 on the slide member 78. The extension 98 of member 90 has mounted thereon an air motor 104 controlled by electrical solenoid means 106 to thereby advance or retract a rod 108 the effective length of which is adjustable by means of screw and nut means 110. Also mounted on the extension 98 is a limit switch box 112 having a plunger 114 and an electrical timing device 116. The work head portion 20 is accordingly advanced and retracted by means of air motor rod 108 connected thereto by means of extension 118. A stop member 120 is also secured to the extension 118 so that when the head portion 20 is retracted it may engage plunger 114 of the limit switch 112 to interrupt rotation of motor 68 to thereby stop reciprocation of the cross slide member 78.

The head portion 20 is slidably mounted on the member 90 by means of plate 122 which is slidably supported on member 90 by means of bearing plate assemblies similar to those shown by FIGURE 5. The plate 122 has mounted thereon a worm gear assembly 126 which is angularly adjustable about the axis of a bolt 128 fixed to the plate 122 by means of plate 130 as shown in section in FIGURE 2. The assembly 126 may be angularly adjusted about bolt 128 by rotation of worm wheel 132 rotating a worm gear 134 in mesh with a gear 136 fixed to the bolt 128 so as to cause angular movement of the whole assembly 126 as the worm wheel 132 is rotated by means of a worm gear 138 connected to a shaft 140 as more clearly seen in FIGURE 1.

A head mounting assembly 142 is bolted to the assembly 126 as seen in FIGURE 1, said assembly 142 also having mounted thereon a spindle driving motor 144 and a start switch box 146 and a retract switch box 148 for purposes as will hereinafter be explained. Rotatably mounted on the assembly 142 is a head 150 of head assembly 28 in which are journaled spindles 32 and 152.

As more clearly seen in FIGURE 3, one of the spindles 32 is geared to the motor 144 by means of a shaft 154 drivingly coupled to the motor 144 and having a gear 156 fixed to the end thereof in mesh with a gear 158 on the inner end of spindle 32. As shown in FIGURE 3 the head 150 is locked to its mounting assembly 142 by means of a lock mechanism generally indicated by reference numeral 160 so that the motor shaft 154 will cause powered rotation of spindle 32. Therefore, when the lock mechanism 160 is momentarily released, powered rotation of the motor shaft 154 will cause both rotation of the loaded spindle 32 and rotation of the head 150 about its central mounting spindle 162 because the loaded spindle 32 is resisting rotation imparted thereto while in meshing engagement with the gear 156, the axis of which is fixed, will impart planetary movement to spindle 32 through gear 158 when head 150 is free to rotate about the spindle 162. This phenomenon is well known to those skilled in the art. The spindle is therefore fixed to the mounting 142 to rotatably mount head 150 on bearings 164 and 166. When the head 150 has rotated the gear 158 out of mesh with gear 156 and completes 180 degrees of rotation by inertia the lock mechanism will relatch the head 150 in a position wherein the spindle 152 is drivingly engaged with the motor shaft 154 by means of gear 168 fixed to the end of spindle 152 then in mesh with gear 156 on the motor shaft.

Referring to both FIGURES 3 and 4, the lock mechanism includes a plunger 170 spring biased into engagement with a notch 172 located within a raised portion 174 fixed to the head 150, said plunger 170 being slidably guided within a tubular member 176 mounted within the assembly 142 and spring biased by means of spring 178 into engagement and releasable by means of handle 180 fixed to the plunger 170 by means of rod 182, said handle 180 being pivoted on the assembly 142 by means of pivot 184. The portion 174 on the head 150 has an inclined portion 186 on one side thereof as seen in FIGURE 4, so that the rotation of the head 150 relative to the mounting assembly 142 in one direction will cause the plunger 170 to yieldably engage said portion 174 and become relatched. It is therefore clear that when the latch mechanism 160 is released so as to permit the motor shaft to cause rotation of the spindle head 150, after 180 degrees rotation of the head 150 the head will become relatched or locked to the mounting assembly 142.

FIGURE 6 shows the electrical circuit diagram as one example, for controlling the operation of the motor 68 for reciprocating the cross slide 78 which causes the work to be moved across the buffing wheel back and forth, the spindle driving motor 144 which is continuously operating to drive one of the two spindles 32 and 152 and the control solenoid 104 for air motor 104 causing advancement and retraction of the workpiece relative to the buffing wheel. The motors 68, 144 and 106 are controlled by means of the electric timer 116 having a timer control on the face thereof for predetermining the length of time during which the motor 104 is advanced and held in advanced position prior to its retraction, the limit switch 112 which interrupts the power circuit to the motor 68 after the workpiece has been fully retracted, said switch 112 being reset when released by rod 120 as it is advanced by motor 104. The switch 146 is depressed in order to initiate operation of the timing device 116 through an automatic cycle while switch 148 is depressed in order to overrule the timing device and cause retraction of the work when desired by the operator. A three wire power supply is shown therefore including lines L1, L2 and L3, said three wires being permanently connected to motor 114 for continuous energization thereof. Wires L1 and L2 are connected to switch 112 for controlling the power line supply through wires L1 and L2, to the timing device 116 and to the motor 68 through switch 170. In the position shown in FIGURE 6, starter switch 146 is shorting terminals 3 and 4 of the timing device 116 through wires T3 and T4. After the timer has been set for some specific length of time as indicated on the face thereof, upon depressing the starter switch button 146 terminals 3 and 4 are opened while wires T6 and T8 are interconnected by the switch 146. Opening of the terminals 3 and 4 initiates operation of the timer 116 from power supplied by lines L1 and L2, closing a circuit between terminals S5 and A8 by means of the timer 116 connecting wire T5 to wire T6 through terminals 5 and 6 while the switch 146 connects wire T6 to wire T8, thereby energizing an advance solenoid control valve (not shown) in control means 106, conditioning the air motor to advance the workpiece. After a predetermined period of time as set on the face of the timer 116, terminals 5 and 6 having been opened by release of starter switch 146, terminals 5 and 7 are connected by the timer so that the terminals R7 and S5 of the solenoid control device 106 are now interconnected to energize a retracting solenoid valve (not shown) causing the air motor to retract the workpiece. When the workpiece reaches fully retracted position, the rod 120 engages the limit switch 112 to interrupt the power circuit to the motor 68. Switch 146 having been released must be actuated once again in order to initiate operation of the timer 116 for another cycle. In the meantime motor 144 continues to rotate and when the lock mechanism handle 180 is actuated to release the lock mechanism 160, the head 150 in its retracted position will rotate 180 degrees before it is relatched by mechanism 160. Prior to releasing of the lock mechanism 160 therefore, when the workpiece is in retracted position, additional work may be mounted on the empty spindle so that when the head 150 is rotated, the new work may be in position for buffing while the old work may be removed from the inoperative spindle.

From the foregoing description, operation of the machine is apparent. Summarizing the sequence of operations therefore, it will be apparent that a workpiece is loaded on a spindle in an idle position, the head is then released by handle 180 so that it is indexed 180 degrees into drive position wherein the spindle that has been loaded is driven by the spindle driving motor 144, the start button 146 is depressed so as to initiate the timer device 116 which accordingly energizes the control device 106 to cause the air motor 104 to advance the workpiece from its loading station toward a work station in engagement with the buffing wheel while at the same time the motor 68 has been energized with release of and resetting of limit switch 112, to cause the workpiece to be reciprocated across the buffing wheel. After a predetermined length of time the timing device 116 changes the circuitry to again energize the control device 106 which causes the air motor 104 to retract the workpiece and when the workpiece reaches its retracted or loading position the limit switch 112 is actuated to interrupt the power supply to motor 68 so that the operator after loading may then load the spindle in the idle position and thereafter disengage the lock mechanism 160 causing rotation of the spindle head 150 for properly positioning the new workpiece in the drive position and the previously buffed workpiece in the idle position for removal thereof. The cycle is then repeated again.

It is also apparent that by controlling the timing of the timer device 116 and the stroke of the adjustable crank 70, different buffing requirements of different pieces may be accommodated. Also by adjusting the height of the table portion 18, as well as its horizontal position in two directions together with the angular adjustment of the mounting assembly 142, different size workpieces and buffing wheels may be accommodated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A work holder machine comprising, selectively indexed work holding means, mounting means carrying said work holding means, continuously operative motor means carried by said mounting means and operatively connected to said work holding means for rotation and indexing thereof, intermittently operative work moving means operatively connected to said mounting means for simultaneous movement thereof in two intersecting directions, control means operatively connected to the work moving means for delayed movement of the mounting means in one of said directions between a work position and a loading position and continuous, rapid reciprocation thereof in the other of said directions, and limit means operatively connected to the control means and operative independently of said motor means to stop reciprocation of the mounting means in response to arrival of the mounting means at said loading position to permit selective indexing of the work holding means by the motor means, said mounting means including a table on which said work holding means is secured, said work moving means including advancing means and reciprocating means, a saddle member mounting said advancing means and slidably supporting said table, said table being connected to said advancing means for advancement thereof and a cross slide member slidably supporting said saddle member, said saddle member having feed screw means for slidably adjusting its position on the cross slide member to vary the work advancing stroke of the advancing means, said cross slide member being slidably supported by a bed, and said reciprocating means being operatively connected to the cross slide member and mounted on said bed.

2. The machine as defined in claim 1, wherein said advancing means includes a reciprocating air motor operatively connected to said mounting means and electrically energized means for causing said air motor to advance and retract said work holding means.

3. A work holder machine comprising, selectively indexed work holding means, mounting means carrying said work holding means, continuously operative motor means carried by said mounting means and operatively connected to said work holding means for rotation and indexing thereof, intermittently operative work moving means operatively connected to said mounting means for simultaneous movement thereof in two intersecting directions, control means operatively connected to the work moving means for delayed movement of the mounting means in one of said directions between a work position and a loading position and continuous, rapid, reciprocation thereof in the other of said directions, and limit means operatively connected to the control means and operative independently of said motor means to stop reciprocation of the mounting means in response to arrival of the mounting means at said loading position to permit selective indexing of the work holding means by the motor means, wherein said control means including electric timing circuit means for predetermining the period of said delay movement.

4. The machine as defined in claim 3, wherein said limit means includes switch means for deenergizing the work moving means when said work holding means is retracted to said loading position.

References Cited in the file of this patent

UNITED STATES PATENTS

| | | |
|---|---|---|
| 1,708,569 | Fotheringham | Apr. 9, 1929 |
| 1,888,710 | Arter et al. | Nov. 22, 1932 |
| 2,003,269 | Arter et al. | May 28, 1935 |
| 2,477,733 | Garside | Aug. 2, 1949 |
| 2,604,740 | Perkins | July 29, 1952 |
| 2,622,375 | Haas et al. | Dec. 23, 1952 |
| 2,840,958 | Waller | July 1, 1958 |